(12) United States Patent
Dominguez Madeira et al.

(10) Patent No.: US 11,685,669 B2
(45) Date of Patent: Jun. 27, 2023

(54) TENSIONER FOR LAMELLA SETTLER

(71) Applicant: Xylem Water Solutions Zelienople LLC, Zelienople, PA (US)

(72) Inventors: Salvador Dominguez Madeira, Charlotte, NC (US); Matthew Sudak, Mars, PA (US)

(73) Assignee: Xylem Water Solutions Zelienople LLC, Zelienople, PA (US)

( * ) Notice: Subject to any disclaimer, the term of this patent is extended or adjusted under 35 U.S.C. 154(b) by 5 days.

(21) Appl. No.: 17/386,999

(22) Filed: Jul. 28, 2021

(65) Prior Publication Data

US 2022/0033277 A1    Feb. 3, 2022

Related U.S. Application Data

(60) Provisional application No. 63/059,357, filed on Jul. 31, 2020.

(51) Int. Cl.
*B01D 21/02* (2006.01)
*C02F 1/00* (2023.01)
*B01D 21/00* (2006.01)

(52) U.S. Cl.
CPC .......... *C02F 1/001* (2013.01); *B01D 21/0003* (2013.01); *B01D 21/0045* (2013.01); *C02F 2001/007* (2013.01); *C02F 2201/002* (2013.01)

(58) Field of Classification Search
CPC ........................ B01D 21/0003; B01D 21/0045
USPC .......................................... 210/521, 522, 802
See application file for complete search history.

(56) References Cited

U.S. PATENT DOCUMENTS

| | | | | |
|---|---|---|---|---|
| 4,194,976 A | * | 3/1980 | Robinsky ........... | B01D 21/0045 210/521 |
| 4,514,303 A | * | 4/1985 | Moore ............... | B01D 21/0045 210/521 |
| 4,957,628 A | | 9/1990 | Schulz | |
| 5,338,449 A | * | 8/1994 | Ichiyanagi ......... | B01D 21/0003 210/521 |
| 5,366,638 A | * | 11/1994 | Moore ............... | B01D 21/0045 210/521 |
| 5,429,752 A | * | 7/1995 | Presby .............. | B01D 21/0042 210/802 |
| 5,736,037 A | * | 4/1998 | Meurer ............. | B01D 21/0003 210/521 |
| 2007/0075024 A1 | | 4/2007 | Campbell | |
| 2021/0069614 A1 | * | 3/2021 | Winters ............. | B01D 21/0003 |

FOREIGN PATENT DOCUMENTS

| | | |
|---|---|---|
| CN | 202173819 U | 3/2012 |
| JP | H657401 U | 8/1994 |
| WO | 2019032850 A1 | 2/2019 |
| WO | 2019043603 A2 | 3/2019 |

* cited by examiner

*Primary Examiner* — Christopher Upton
(74) *Attorney, Agent, or Firm* — The Webb Law Firm

(57) ABSTRACT

The present invention is directed to a clarifier for water treatment including a module. The module includes a planar inclined sheet; a plurality of vertically-oriented supports; and a tensioner. The at least one planar inclined sheet is tensioned between the plurality of vertically-oriented supports and the tensioner is configured to bring the planar inclined sheet to an even centerline.

20 Claims, 17 Drawing Sheets

TENSIONER FOR LAMELLA SETTLER

CROSS REFERENCE TO RELATED APPLICATIONS

This application claims priority to U.S. Provisional Patent Application No. 63/059,357, filed Jul. 31, 2020, the disclosure of which is hereby incorporated in its entirety by reference.

BACKGROUND OF THE INVENTION

Field of the Invention

The present invention relates to a clarifier for water treatment, a water treatment system, and a method for treating water (e.g., wastewater, industrial water, source water for potable water).

Description of Related Art

Clarifiers using inclined sheets are used in the clarification process in a water treatment system. Prior to the clarification process, the water is subjected to certain chemistry, such as aluminum, iron, or polymers in order to coagulate the particles in the water to form an agglomerate of the particles hereafter referred to as floc. The water with suspended floc then travels up through the sheets and via sedimentation the floc particles accumulate on the sheets due to gravity, leaving clarified water to proceed to the top of the system.

The inclined sheets are tensioned between vertically-oriented supports. However, the inclined plates or sheets may extend or shrink over time, due to repeated use. The inclined sheets will begin to sag over time, such that the inclined sheets are no longer tensioned to an even centerline. This deviation of the inclined sheets from the tensioned centerline results in a decrease in the ability of the clarifier to effectively clarify the water. Therefore, it would be desirable to design a clarifier that prevents sagging of the inclined sheets.

SUMMARY OF THE INVENTION

The present invention is directed to a clarifier for water treatment including: a module comprising: a planar inclined sheet; a plurality of vertically-oriented supports; and a tensioner; where the planar inclined sheet is tensioned between the plurality of vertically-oriented supports; and where the tensioner is configured to bring the planar inclined sheet to an even centerline.

The tensioner may be provided internal of the plurality of vertically-oriented supports and push against the plurality of vertically-oriented supports to bring the planar inclined sheet to an even centerline. The tensioner may include a tensioner oriented horizontally and located at the middle of the module. The tensioner may include a tensioner oriented horizontally and positioned at the bottom of the module. The tensioner may be provided external of the plurality of vertically-oriented supports and pull on a vertically-oriented support of the plurality of vertically-oriented supports to bring the planar inclined sheet to an even centerline. The clarifier may include a first tensioner oriented horizontally on a first side of the module and located at the middle of the module, and second tensioner oriented horizontally on a second side opposite the first side of the module and located at the middle of the module. The clarifier may include a first tensioner oriented horizontally on a first side of the module and located at the bottom of the module, and second tensioner oriented horizontally on a second side opposite the first side of the module and located at the bottom of the module. The planar inclined sheet may include a flexible polymeric material. The flexible polymeric material may include a polyethylene (e.g., high density polyethylene (HDPE), low density polyethylene (LDPE), linear low density polyethylene (LLDPE)), polypropylene (PP), polyvinyl chloride (PVC), polyester, or some combination thereof. The flexible polymeric material may be a hydrophobic material. A surface of the flexible polymeric material may be a fabric treated with a hydrophobic material to form the hydrophobic surface.

The clarifier may include a plurality of planar inclined sheets. The plurality of planar inclined sheets may be positioned at an angle relative to the ground of from 10° to 90°. The plurality of planar inclined sheets may be arranged parallel to one another, and each sheet of the plurality of planar inclined sheets may be tensioned between a plurality of vertically-oriented supports. Vertically-oriented supports tensioning a first sheet of the plurality of planar inclined sheets may interlock with adjacent vertically-oriented supports tensioning a second sheet of the plurality of planar inclined sheets. A vertically-oriented support of the plurality of vertically-oriented supports may include an inlet opening configured to allow liquid to flow therethrough.

The clarifier may include a plurality of tensioners. The clarifier may include a plurality of modules. At least one tensioner of the plurality of tensioners may be present on every second module of the plurality of modules. The plurality of modules may be arranged parallel to one another. The plurality of modules may be positioned at an angle relative to the ground of from 10° to 90°. The plurality of modules may interlock with one another. Each vertically-oriented support may include a first side including a tongue and a second side including a groove, where the plurality of modules interlock with one another by the tongue of a first vertically-oriented support engaging a groove of a second adjacent vertically-oriented support.

The present invention is also directed to a water treatment system including: a basin; and a clarifier including: a module including: a planar inclined sheet; a plurality of vertically-oriented supports; and a tensioner; where the planar inclined sheet is tensioned between the plurality of vertically-oriented supports; and where the tensioner is configured to bring the planar inclined sheet to an even centerline, the clarifier positioned in the basin.

The water treatment system may further include a collection system comprising a collection trough arranged at least partially above the clarifier.

The tensioner may be provided internal of the plurality of vertically-oriented supports and push against the plurality of vertically-oriented supports to bring the planar inclined sheet to an even centerline. The tensioner may include a tensioner oriented horizontally and located at the middle of the module. The tensioner may include a tensioner oriented horizontally and positioned at the bottom of the module. The tensioner may be provided external of the plurality of vertically-oriented supports and pull on a vertically-oriented support of the plurality of vertically-oriented supports to bring the planar inclined sheet to an even centerline. The clarifier may include a first tensioner oriented horizontally on a first side of the module and located at the middle of the module, and second tensioner oriented horizontally on a second side opposite the first side of the module and located at the middle of the module. The clarifier may include a first tensioner oriented horizontally on a first side of the module and located at the bottom of the module, and second tensioner oriented horizontally on a second side opposite the first side of the module and located at the bottom of the module. The planar inclined sheet may include a flexible polymeric material. The flexible polymeric material may include a polyethylene (e.g., high density polyethylene (HDPE), low density polyethylene (LDPE), linear low density polyethylene (LLDPE)), polypropylene (PP), polyvinyl chloride (PVC), polyester, or some combination thereof. The flexible polymeric material may be a hydrophobic material. A surface of the flexible polymeric material may be a fabric treated with a hydrophobic material to form the hydrophobic surface.

The clarifier may include a plurality of planar inclined sheets. The plurality of planar inclined sheets may be positioned at an angle relative to the ground of from 10° to 90°. The plurality of planar inclined sheets may be arranged parallel to one another, and each sheet of the plurality of planar inclined sheets may be tensioned between a plurality of vertically-oriented supports. Vertically-oriented supports tensioning a first sheet of the plurality of planar inclined sheets may interlock with adjacent vertically-oriented supports tensioning a second sheet of the plurality of planar inclined sheets. A vertically-oriented support of the plurality of vertically-oriented supports may include an inlet opening configured to allow liquid to flow therethrough.

The clarifier may include a plurality of tensioners. The clarifier may include a plurality of modules. At least one tensioner of the plurality of tensioners may be present on every second module of the plurality of modules. The plurality of modules may be arranged parallel to one another. The plurality of modules may be positioned at an angle relative to the ground of from 10° to 90°. The plurality of modules may interlock with one another. Each vertically-oriented support may include a first side including a tongue and a second side including a groove, where the plurality of modules interlock with one another by the tongue of a first vertically-oriented support engaging a groove of a second adjacent vertically-oriented support.

The present invention is also directed to a method for treating water including: providing a clarifier including: a module including: a planar inclined sheet; a plurality of vertically-oriented supports; and a tensioner; where the planar inclined sheet is tensioned between the plurality of vertically-oriented supports; and where the tensioner is configured to bring the planar inclined sheet to an even centerline; flowing water to the clarifier; and collecting clarified water and/or waste material separated from the water by the clarifier.

The tensioner may be provided internal of the plurality of vertically-oriented supports and pushes against the plurality of vertically-oriented supports to bring the planar inclined sheet to an even centerline. The tensioner may include a tensioner oriented horizontally and positioned at the middle of the module. The tensioner may include a tensioner oriented horizontally and positioned at the bottom of the module. The tensioner may be provided external of the plurality of vertically-oriented supports and pulls on the plurality of vertically-oriented supports to bring the planar inclined sheet to an even centerline. The clarifier may include a first tensioner oriented horizontally on a first side of the module and located at the middle of the module, and second tensioner oriented horizontally on a second side opposite the first side of the module and located at the middle of the module. The clarifier may include a first tensioner oriented horizontally on a first side of the module and located at the bottom of the module, and second tensioner oriented horizontally on a second side opposite the first side of the module and located at the bottom of the module. The planar inclined sheet may include a flexible polymeric material. The flexible polymeric material may include a polyethylene (e.g., high density polyethylene (HDPE), low density polyethylene (LDPE), linear low density polyethylene (LLDPE)), polypropylene (PP), polyvinyl chloride (PVC), polyester, or some combination thereof. The flexible polymeric material may be a hydrophobic material. A surface of the flexible polymeric material may be a fabric treated with a hydrophobic material to form the hydrophobic surface.

The clarifier may include a plurality of planar inclined sheets. The plurality of planar inclined sheets may be positioned at an angle relative to the ground of from 10° to 90°. The plurality of planar inclined sheets may be arranged parallel to one another, and each sheet of the plurality of planar inclined sheets may be tensioned between a plurality of vertically-oriented supports. Vertically-oriented supports tensioning a first sheet of the plurality of planar inclined sheets may interlock with adjacent vertically-oriented supports tensioning a second sheet of the plurality of planar inclined sheets. A vertically-oriented support of the plurality of vertically-oriented supports may include an inlet opening configured to allow liquid to flow therethrough.

The clarifier may include a plurality of tensioners. The clarifier may include a plurality of modules. At least one tensioner of the plurality of tensioners may be present on every second module of the plurality of modules. The plurality of modules may be arranged parallel to one another. The plurality of modules may be positioned at an angle relative to the ground of from 10° to 90°. The plurality of modules may interlock with one another. Each vertically-oriented support may include a first side including a tongue and a second side including a groove, where the plurality of modules interlock with one another by the tongue of a first vertically-oriented support engaging a groove of a second adjacent vertically-oriented support.

The present invention further includes the subject matter of the following clauses.

Clause 1: A clarifier for water treatment comprising: a module comprising: a planar inclined sheet; a plurality of vertically-oriented supports; and a tensioner; wherein the planar inclined sheet is tensioned between the plurality of vertically-oriented supports; and wherein the tensioner is configured to bring the planar inclined sheet to an even centerline.

Clause 2: The clarifier of clause 1, wherein the tensioner is provided internal of the plurality of vertically-oriented supports and pushes against the plurality of vertically-oriented supports to bring the planar inclined sheet to an even centerline.

Clause 3: The clarifier of clause 1 or 2, wherein the tensioner comprises a tensioner oriented horizontally and located at the middle of the module.

Clause 4: The clarifier of any of clauses 1-3, wherein the tensioner comprises a tensioner oriented horizontally and located at the bottom of the module.

Clause 5: The clarifier of clause 1, wherein the tensioner is provided external of the plurality of vertically-oriented supports and pulls on a vertically-oriented support of the plurality of vertically-oriented supports to bring the planar inclined sheet to an even centerline.

Clause 6: The clarifier of clause 5, wherein the tensioner comprises a first tensioner oriented horizontally and on a first side of the module and located at the middle of the module, and second tensioner oriented horizontally and on a second side of the module opposite the first side and located at the middle of the module.

Clause 7: The clarifier of clause 5 or 6, wherein the tensioner comprises a first tensioner oriented horizontally and on a first side of the module and located at the bottom of the module, and second tensioner oriented horizontally and on a second side of the module opposite the first side and located at the middle of the module.

Clause 8: The clarifier of any of clauses 1-7, wherein the planar inclined sheet comprises a flexible polymeric material.

Clause 9: The clarifier of clause 8, wherein the flexible polymeric material comprises polyethylene such as high density polyethylene, low density polyethylene, and/or linear low density polyethylene, polypropylene, polyvinyl chloride, polyester, or a combination thereof.

Clause 10: The clarifier of clause 8 or 9, wherein the flexible polymeric material is a hydrophobic material.

Clause 11: The clarifier of clause 8 or 9, wherein a surface of the flexible polymeric material is fabric treated with a hydrophobic material to form a hydrophobic surface.

Clause 12: The clarifier of any of clauses 1-11, comprising a plurality of planar inclined sheets.

Clause 13: The clarifier of clause 12, wherein the plurality of planar inclined sheets are positioned at an angle relative to the ground of from 10° to 90°.

Clause 14: The clarifier of clause 12 or 13, wherein the plurality of planar inclined sheets are arranged parallel to one another, and each sheet of the plurality of planar inclined sheets is tensioned between a plurality of vertically-oriented supports.

Clause 15: The clarifier of an of clauses 12-14, wherein vertically-oriented supports tensioning a first sheet of the plurality of planar inclined sheets interlock with adjacent vertically-oriented supports tensioning a second sheet of the plurality of planar inclined sheets.

Clause 16: The clarifier of any of clauses 1-15, wherein a vertically-oriented support of the plurality of vertically-oriented supports comprises an inlet opening configured to allow liquid to flow therethrough.

Clause 17: The clarifier of any of clauses 1-16, comprising a plurality of tensioners.

Clause 18: The clarifier of any of clauses 1-17, comprising a plurality of modules.

Clause 19: The clarifier of clause 18, wherein the plurality of modules are positioned at an angle relative to the ground of from 10° to 90°.

Clause 20: The clarifier of clause 18 or 19, wherein the plurality of modules interlock with one another.

Clause 21: The clarifier of clause 20, wherein each vertically-oriented support comprises a first side comprising a tongue and a second side comprising a groove, wherein the plurality of modules interlock with one another by the tongue of a first vertically-oriented support engaging a groove of a second adjacent vertically-oriented support.

Clause 22: The clarifier of any of clauses 1-21, comprising a plurality of modules and a plurality of tensioners, wherein at least one tensioner of the plurality of tensioners is present on every second module of the plurality of modules.

Clause 23: A water treatment system comprising: a basin; and a clarifier comprising: a module comprising: a planar inclined sheet; a plurality of vertically-oriented supports; and a tensioner; where the planar inclined sheet is tensioned between the plurality of vertically-oriented supports; and wherein the tensioner is configured to bring the planar inclined sheet to an even centerline, the clarifier positioned in the basin.

Clause 24: The water treatment system of clause 23, further comprising a collection system comprising a collection trough arranged at least partially above the clarifier.

Clause 25: The water treatment system of clause 23 or 24, wherein the tensioner is provided internal of the plurality of vertically-oriented supports and pushes against the plurality of vertically-oriented supports to bring the planar inclined sheet to an even centerline.

Clause 26: The water treatment system of any of clauses 23-25, wherein the tensioner comprises a tensioner oriented horizontally and located at the middle of the module.

Clause 27: The water treatment system of any of clauses 23-26, wherein the tensioner comprises a tensioner oriented horizontally and located at the bottom of the module.

Clause 28: The water treatment system of clause 23, wherein the tensioner is provided external of the plurality of vertically-oriented supports and pulls on a vertically-oriented support of the plurality of vertically-oriented supports to bring the planar inclined sheet to an even centerline.

Clause 29: The water treatment system of clause 28, wherein the tensioner comprises a first tensioner oriented horizontally and on a first side of the module and located at the middle of the module, and second tensioner oriented horizontally and on a second side of the module opposite the first side and located at the middle of the module.

Clause 30: The water treatment system of clause 28 or 29, wherein the tensioner comprises a first tensioner oriented horizontally and on a first side of the module and located at the bottom of the module, and second tensioner oriented horizontally and on a second side of the module opposite the first side and located at the middle of the module.

Clause 31: The water treatment system of any of clauses 23-30, wherein the planar inclined sheet comprises a flexible polymeric material.

Clause 32: The water treatment system of clause 31, wherein the flexible polymeric material comprises polyethylene such as high density polyethylene, low density polyethylene, and/or linear low density polyethylene, polypropylene, polyvinyl chloride, polyester, or a combination thereof.

Clause 33: The water treatment system of clause 31 or 32, wherein the flexible polymeric material is a hydrophobic material.

Clause 34: The water treatment system of clause 31 or 32, wherein a surface of the flexible polymeric material is fabric treated with a hydrophobic material to form a hydrophobic surface.

Clause 35: The water treatment system of any of clauses 23-34, comprising a plurality of planar inclined sheets.

Clause 36: The water treatment system of clause 35, wherein the plurality of planar inclined sheets are positioned at an angle relative to the ground of from 10° to 90°.

Clause 37: The water treatment system of clause 35 or 36, wherein the plurality of planar inclined sheets are arranged parallel to one another, and each sheet of the plurality of planar inclined sheets is tensioned between a plurality of vertically-oriented supports.

Clause 38: The water treatment system of an of clauses 35-37, wherein vertically-oriented supports tensioning a first sheet of the plurality of planar inclined sheets interlock with adjacent vertically-oriented supports tensioning a second sheet of the plurality of planar inclined sheets.

Clause 39: The water treatment system of any of clauses 23-38, wherein a vertically-oriented support of the plurality of vertically-oriented supports comprises an inlet opening configured to allow liquid to flow therethrough.

Clause 40: The water treatment system of any of clauses 23-39, wherein the clarifier comprises a plurality of tensioners.

Clause 41: The water treatment system of any of clauses 23-40, wherein the clarifier comprises a plurality of modules.

Clause 42: The water treatment system of clause 41, wherein the plurality of modules are positioned at an angle relative to the ground of from 10° to 90°.

Clause 43: The water treatment system of clause 41 or 42, wherein the plurality of modules interlock with one another.

Clause 44: The water treatment system of clause 43, wherein each vertically-oriented support comprises a first side comprising a tongue and a second side comprising a groove, wherein the plurality of modules interlock with one another by the tongue of a first vertically-oriented support engaging a groove of a second adjacent vertically-oriented support.

Clause 45: The water treatment system of any of clauses 23-44, wherein the clarifier comprises a plurality of modules and a plurality of tensioners, wherein at least one tensioner of the plurality of tensioners is present on every second module of the plurality of modules.

Clause 46: A method for treating water including: providing a clarifier including: a module including: a planar inclined sheet; a plurality of vertically-oriented supports; and a tensioner; where the planar inclined sheet is tensioned between the plurality of vertically-oriented supports; and where the tensioner is configured to bring the planar inclined sheet to an even centerline; flowing water to the clarifier; and collecting clarified water and/or waste material separated from the water by the clarifier.

Clause 47: The method of clause 46, wherein the tensioner is provided internal of the plurality of vertically-oriented supports and pushes against the plurality of vertically-oriented supports to bring the planar inclined sheet to an even centerline.

Clause 48: The method of any of clauses 46-47, wherein the tensioner comprises a tensioner oriented horizontally and located at the middle of the module.

Clause 49: The method of any of clauses 46-48, wherein the tensioner comprises a tensioner oriented horizontally and located at the bottom of the module.

Clause 50: The method of clause 46, wherein the tensioner is provided external of the plurality of vertically-oriented supports and pulls on a vertically-oriented support of the plurality of vertically-oriented supports to bring the planar inclined sheet to an even centerline.

Clause 51: The method of clause 50, wherein the tensioner comprises a first tensioner oriented horizontally and on a first side of the module and located at the middle of the module, and second tensioner oriented horizontally and on a second side of the module opposite the first side and located at the middle of the module.

Clause 52: The method of clause 50 or 51, wherein the tensioner comprises a first tensioner oriented horizontally and on a first side of the module and located at the bottom of the module, and second tensioner oriented horizontally and on a second side of the module opposite the first side and located at the middle of the module.

Clause 53: The method of any of clauses 46-52, wherein the planar inclined sheet comprises a flexible polymeric material.

Clause 54: The method of clause 53, wherein the flexible polymeric material comprises polyethylene such as high density polyethylene, low density polyethylene, and/or linear low density polyethylene, polypropylene, polyvinyl chloride, polyester, or a combination thereof.

Clause 55: The method of clause 53 or 54, wherein the flexible polymeric material is a hydrophobic material.

Clause 56: The method of clause 53 or 54, wherein a surface of the flexible polymeric material is fabric treated with a hydrophobic material to form a hydrophobic surface.

Clause 57: The method of any of clauses 46-56, comprising a plurality of planar inclined sheets.

Clause 58: The method of clause 57, wherein the plurality of planar inclined sheets are positioned at an angle relative to the ground of from 10° to 90°.

Clause 59: The method of clause 57 or 58, wherein the plurality of planar inclined sheets are arranged parallel to one another, and each sheet of the plurality of planar inclined sheets is tensioned between a plurality of vertically-oriented supports.

Clause 60: The method of an of clauses 57-59, wherein vertically-oriented supports tensioning a first sheet of the plurality of planar inclined sheets interlock with adjacent vertically-oriented supports tensioning a second sheet of the plurality of planar inclined sheets.

Clause 61: The method of any of clauses 46-60, wherein a vertically-oriented support of the plurality of vertically-oriented supports comprises an inlet opening configured to allow liquid to flow therethrough.

Clause 62: The method of any of clauses 46-61, wherein the clarifier comprises a plurality of tensioners.

Clause 63: The method of any of clauses 46-62, wherein the clarifier comprises a plurality of modules.

Clause 64: The method of clause 63, wherein the plurality of modules are positioned at an angle relative to the ground of from 10° to 90°.

Clause 65: The method of clause 63 or 64, wherein the plurality of modules interlock with one another.

Clause 66: The method of clause 65, wherein each vertically-oriented support comprises a first side comprising a tongue and a second side comprising a groove, wherein the plurality of modules interlock with one another by the tongue of a first vertically-oriented support engaging a groove of a second adjacent vertically-oriented support.

Clause 67: The method of any of clauses 46-66, wherein the clarifier comprises a plurality of modules and a plurality of tensioners, wherein at least one tensioner of the plurality of tensioners is present on every second module of the plurality of modules.

DESCRIPTION OF THE INVENTION

Figure 1:
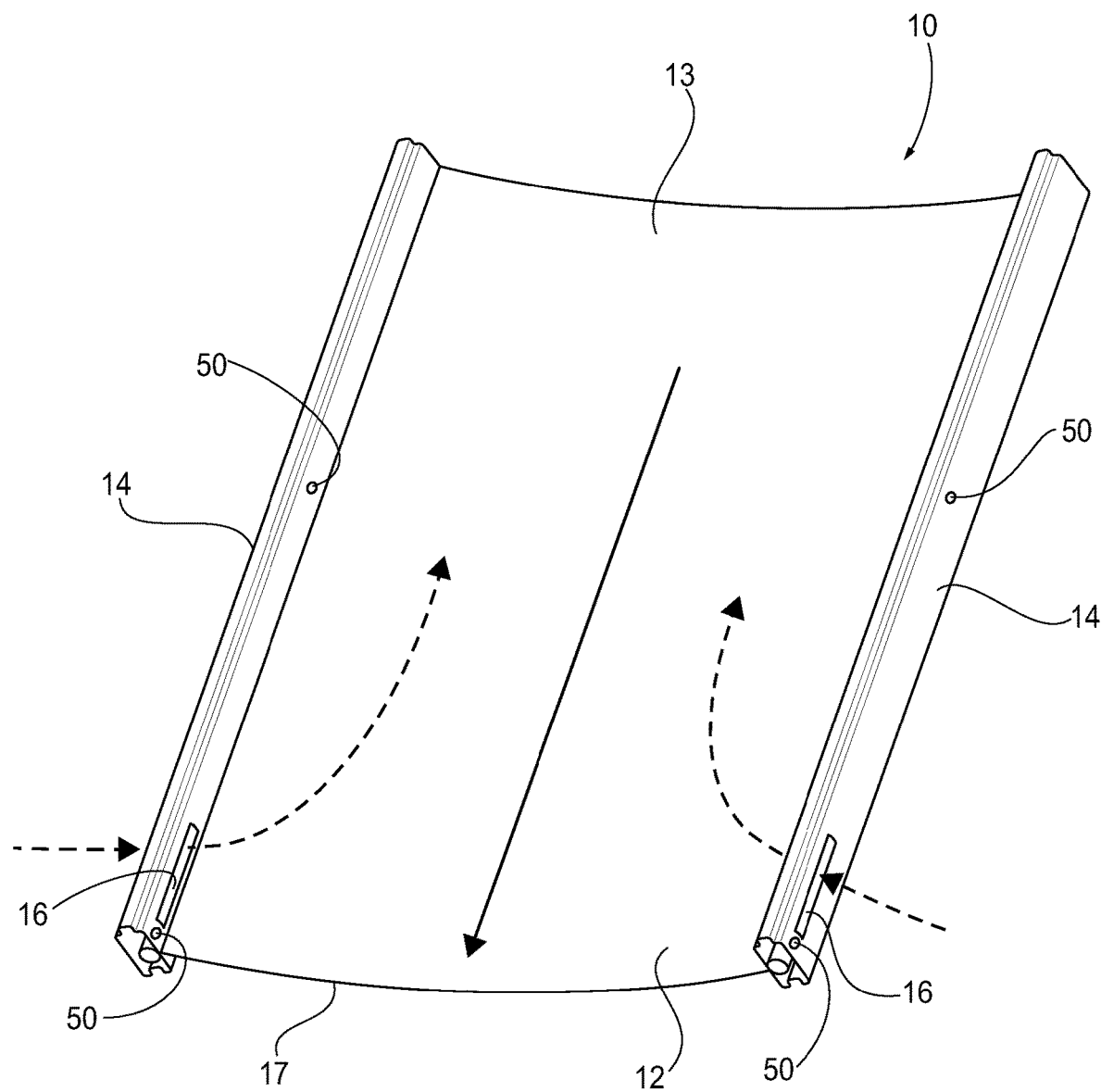
FIG. 1 shows a perspective view of a module of a clarifier for water treatment.

For purposes of the description hereinafter, the terms "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

All numbers used in the specification and claims are to be understood as being modified in all instances by the term "about." The terms "approximately," "about," and "substantially" mean a range of plus or minus ten percent of the stated value.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise.

Referring to FIG. 1, a module 10 for use in a clarifier for water treatment according to a non-limiting embodiment is shown. The module 10 includes a sheet 12, which may include a flexible polymeric material. The sheet 12 may have a hydrophobic surface 13. The sheet 13 may be substantially planar. In some non-limiting embodiments, the flexible polymeric material may be a hydrophobic material. As used herein, the term "hydrophobic material" or "hydrophobic surface" refers to a material or surface which exhibits a Water Contact Angle (WCA) of at least 90° when contacted with water. In some non-limiting examples, the flexible polymeric material includes a fabric treated with a hydrophobic material to form the hydrophobic surface 13. Examples of hydrophobic material includes silica gel, graphite, and/or graphene. The flexible polymeric material may include polyester, polyethylene (e.g., high density polyethylene (HDPE), low density polyethylene (LDPE), linear low density polyethylene (LLDPE)), polyvinyl chloride (PVC), or some combination thereof.

With continued reference to FIG. 1, the module 10 may include a plurality of vertically-oriented supports 14. The vertically-oriented supports 14 may be arranged non-parallel with the ground and may form an angle with the ground of from 10° to 90°, such as from 20° to 80°, from 35° to 70°, from 40° to 60°, from 45° to 65°, or from 45° to 55°, so as to be inclined. The angle formed by the vertically-oriented supports 14 relative to the ground may be varied. The angle may be varied using any suitable system known in the art. The sheet 12 may be tensioned between the vertically-oriented supports 14. The sheet 12 tensioned between the vertically-oriented supports 14 may form the same angle relative to the ground as the vertically-oriented supports 14. The sheet 12 between the vertically-oriented supports may be arranged so as to form an inclined module 10 having an inclined sheet 12.

With continued reference to FIG. 1, at least one of the vertically-oriented supports 14 may include an inlet opening 16 configured to allow liquid to flow therethrough. The dashed arrows and solid arrow show the flow of water and waste materials in the non-limiting embodiment of the module 10 shown. Water enters the module 10 through the inlet openings 16 of the vertically-oriented supports as shown by the dashed arrows. As the water moves up the inclined sheet 12, it is clarified by the waste materials (e.g., sludge) contained in the water flowed to the module 10 settling to the bottom of the module 10 at the base 17 of the clarifier. The flow of waste materials settling at the base 17 is shown by the solid arrow.

With continued reference to FIG. 1, the plurality of vertically-oriented supports 14 may comprise a plurality of holes 50 configured to secure a tensioner, described hereafter, to the plurality of vertically-oriented supports 14. In one non-limiting embodiment, the plurality of vertically-oriented supports 14 include a hole 50 located at the middle of the module 10 and/or a hole 50 located at the bottom of the module 10. It is appreciated that the "middle" of the module 10 is measured vertically, relative to the ground, along the surface of the module 10 starting from the base 17 of the clarifier to the top of the module 10 and is located at about half of said measured distance. It is also appreciated that the "bottom" of the module 10 is located at the base 17 of the clarifier. The plurality of holes 50 may be through holes such that an object may be inserted through one side of the vertically-oriented supports 14 and out the other side of the vertically-oriented supports 14.

Figure 2:
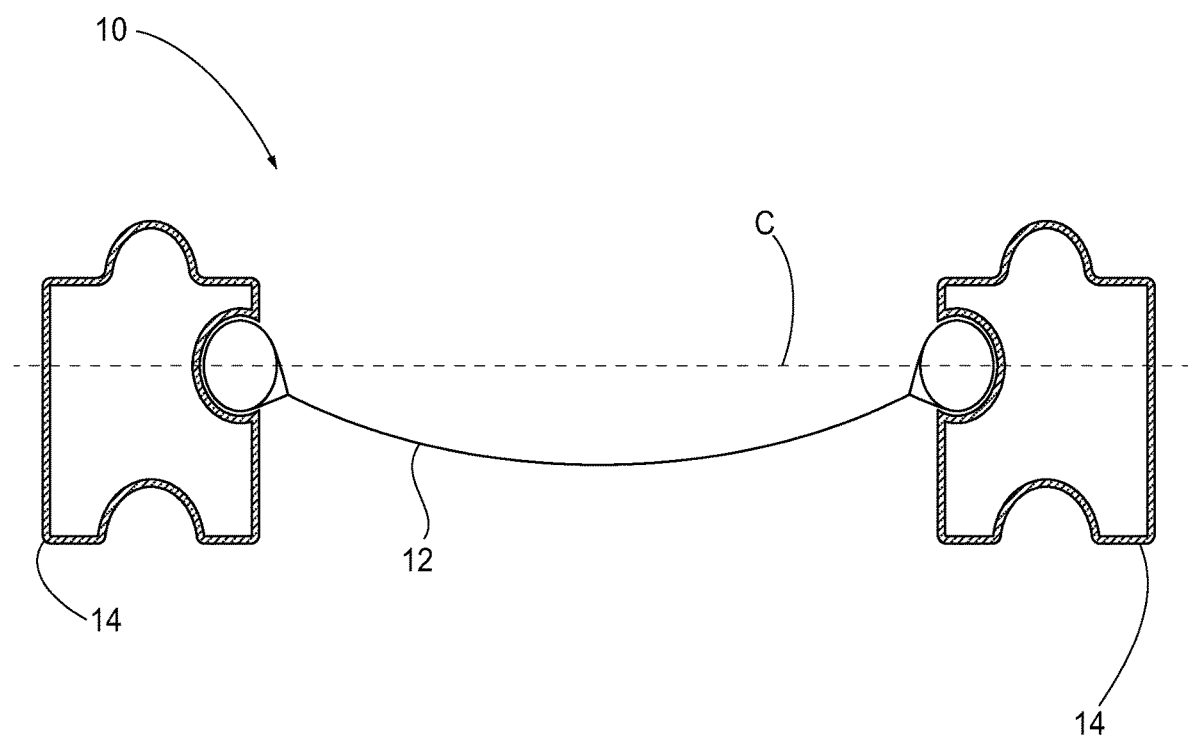
FIG. 2 shows a bottom view of a module of a clarifier for water treatment.

Referring to FIG. 2, the module 10 may include at least one planar inclined sheet 12 tensioned between the plurality of vertically-oriented supports 14. The at least one planar inclined sheet 12 may sag between the plurality of vertically oriented supports 14, such that the planar inclined sheet 12 is not at an even centerline C. An "even centerline C" refers to a reference line running between and perpendicular to the plurality of vertically-oriented supports 14 that identifies the positioning of the at least one planar inclined sheet 12 when the at least one planar inclined sheet 12 is taught between the plurality of vertically-oriented supports 14 and does not sag, resulting in effective clarification of wastewater. Due to sagging and/or shrinking of the at least one planar inclined sheet 12, the at least one planar inclined sheet 12 may not form an even centerline C, and instead, the at least one planar inclined sheet 12 sags below the even centerline C, resulting in poor clarification of wastewater. The at least one tensioner (described below) may be used to bring the at least one planar inclined sheet 12 to an even centerline C.

Figure 3:
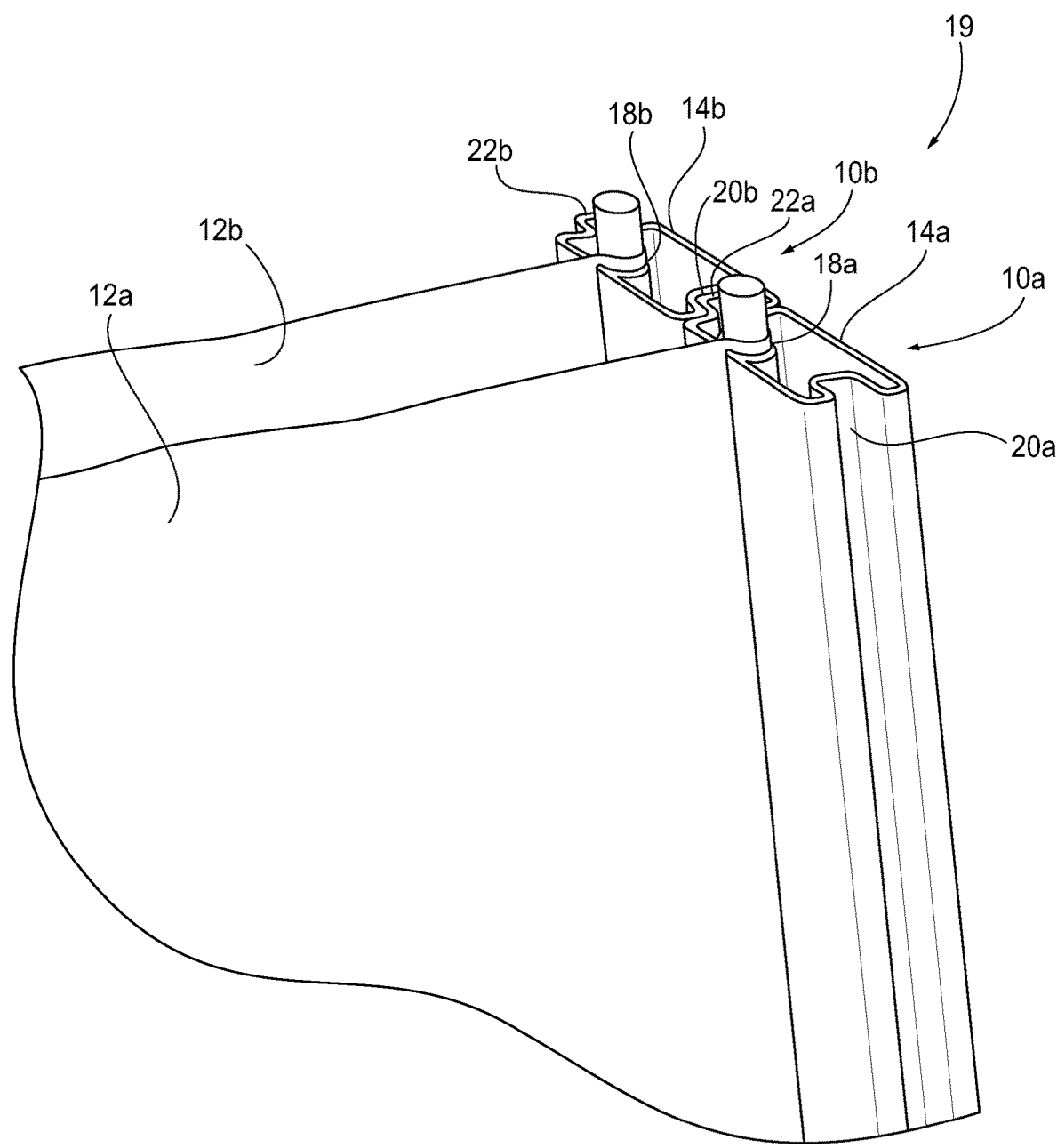
FIG. 3 shows a perspective view of two interlocked modules of a clarifier for water treatment.

Referring to FIG. 3, a clarifier 19 is shown according to one non-limiting embodiment. The clarifier 19 may include a plurality of planar inclined sheets 12a, 12b. The clarifier 19 may include at least one module 10a, 10b, such as two modules 10a, 10b as shown in FIG. 3. It is appreciated that any number of modules 10a, 10b may be used in the clarifier 19. The plurality of sheets 12a, 12b may be arranged in the clarifier 19 parallel to one another, with each sheet 12a, 12b tensioned between a plurality of vertically-oriented supports 14 (they may be the same or different vertically-oriented supports 14). The modules 10a, 10b may also be arranged in the clarifier 19 parallel to one another.

With continued reference to FIG. 3, a non-limiting embodiment of the vertically-oriented supports 14a, 14b is shown. The vertically-oriented supports 14a, 14b may include a recess 18a, 18b to receive the sheet 12a, 12b, such that the sheet 12a, 12b can be tensioned between the vertically-oriented supports 14a, 14b. The sheet 12a, 12b may be fitted over a rod, which is inserted into the recess 18a, 18b, such that the sheet 12a, 12b can be tensioned between the vertically-oriented supports 14a, 14b.

With continued reference to FIG. 3, the modules 10a, 10b of the clarifier 19 may interlock with one another. In one non-limiting embodiment, a first module 10a may interlock with a second adjacent module 10b by the vertically-oriented supports 14a of the first module 10a interlocking with the vertically-oriented supports 14b of the second module 10b. The vertically-oriented supports 14a, 14b may include a first side including a groove 20a, 20b and a second side including a tongue 22a, 22b. The vertically-oriented supports 14a, 14b may interlock with one another by the groove 20b of the first vertically-oriented support 14a engaging the tongue 22a of the second vertically-oriented support 14b.

Figure 4:
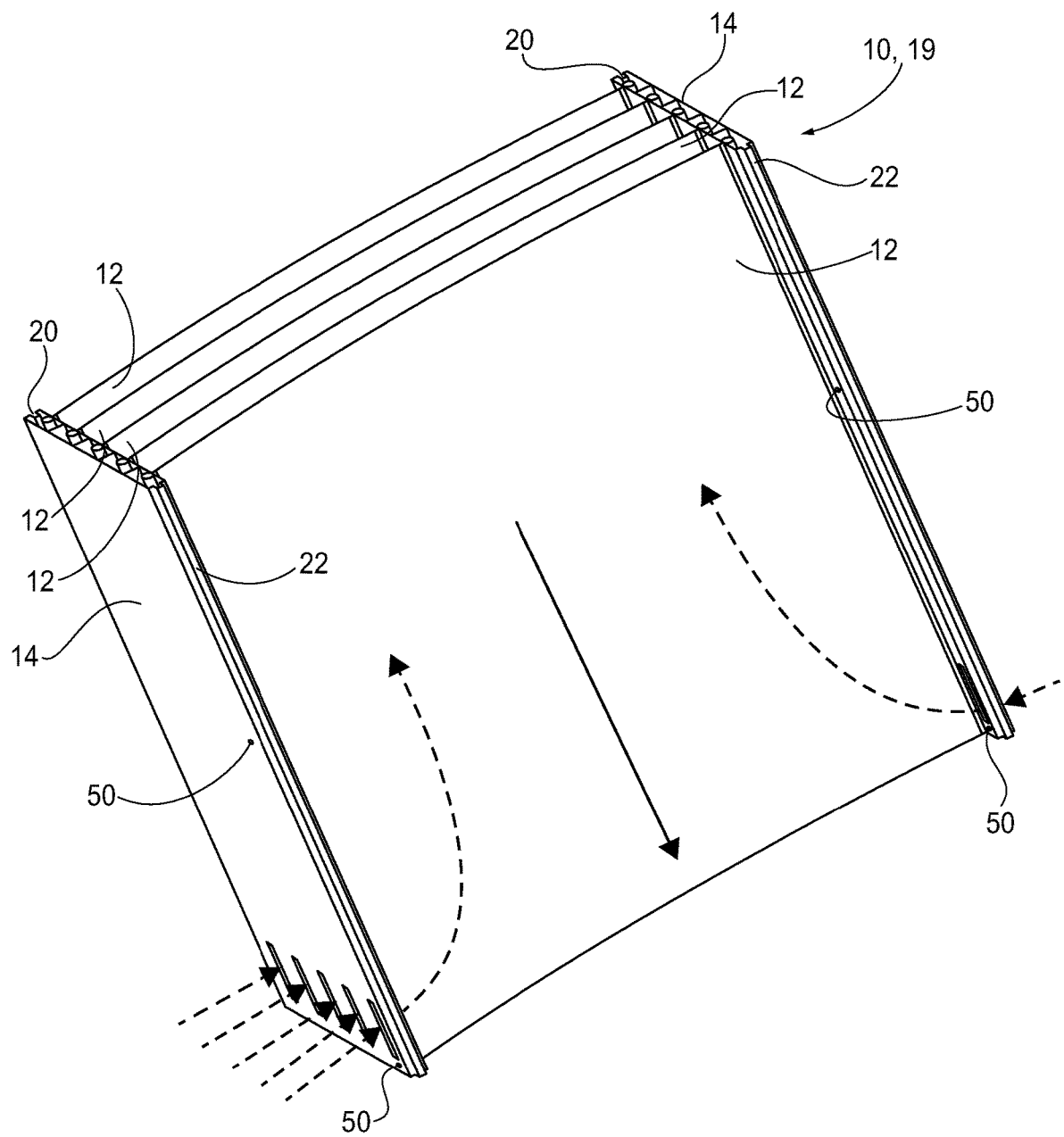
FIG. 4 shows a perspective view of a module including a plurality of planar inclined sheets.
Figure 5:
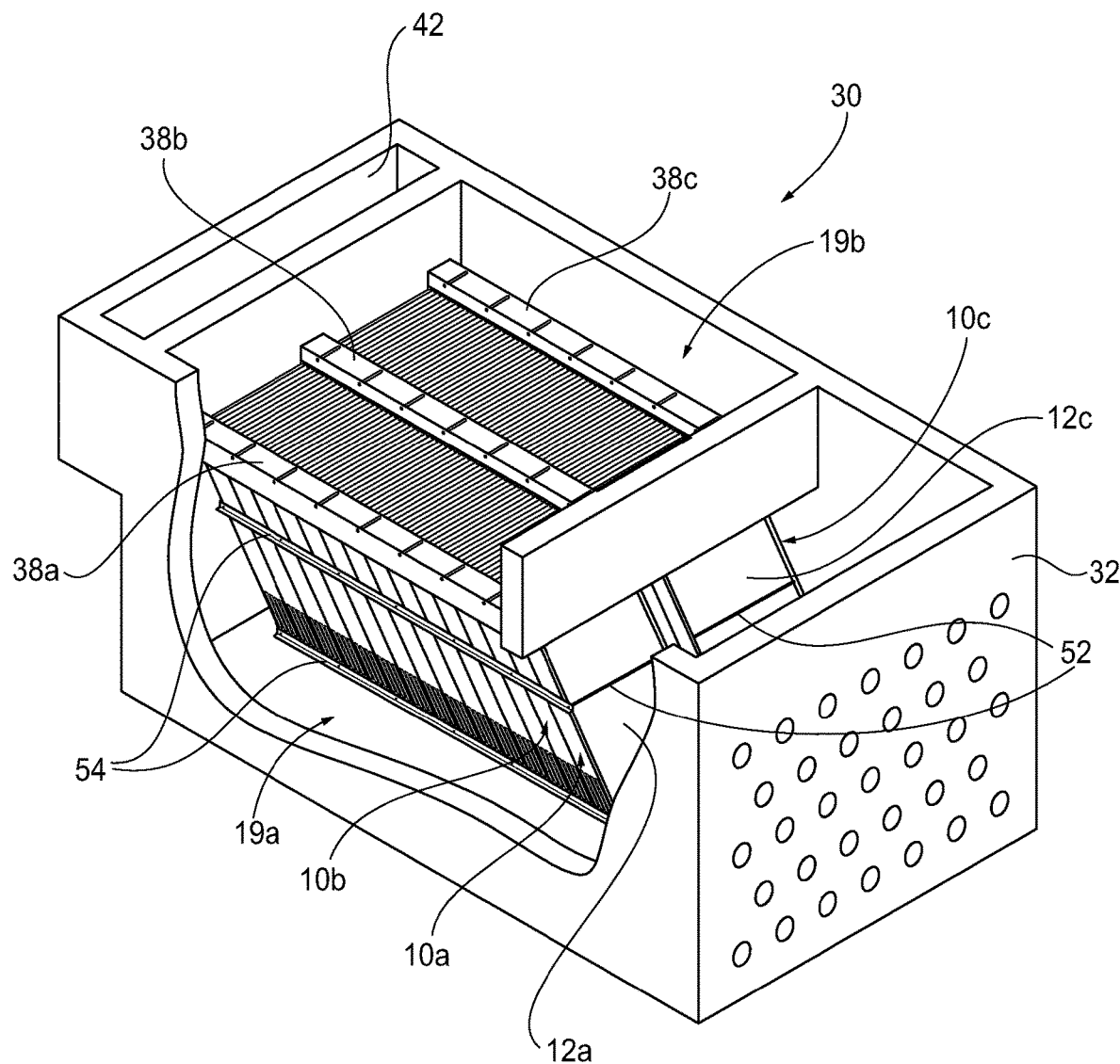
FIG. 5 shows a perspective view of a water treatment system.
Figure 6:
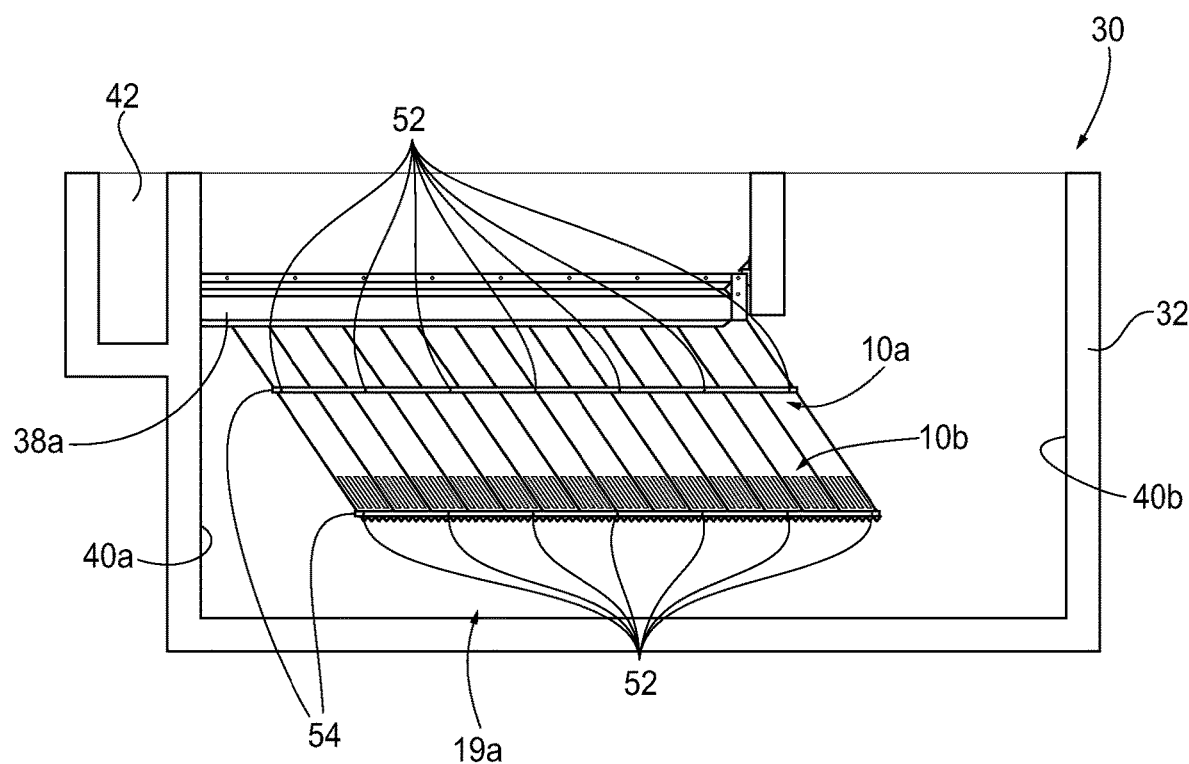
FIG. 6 shows a side view of the water treatment system of FIG. 5.
Figure 7:
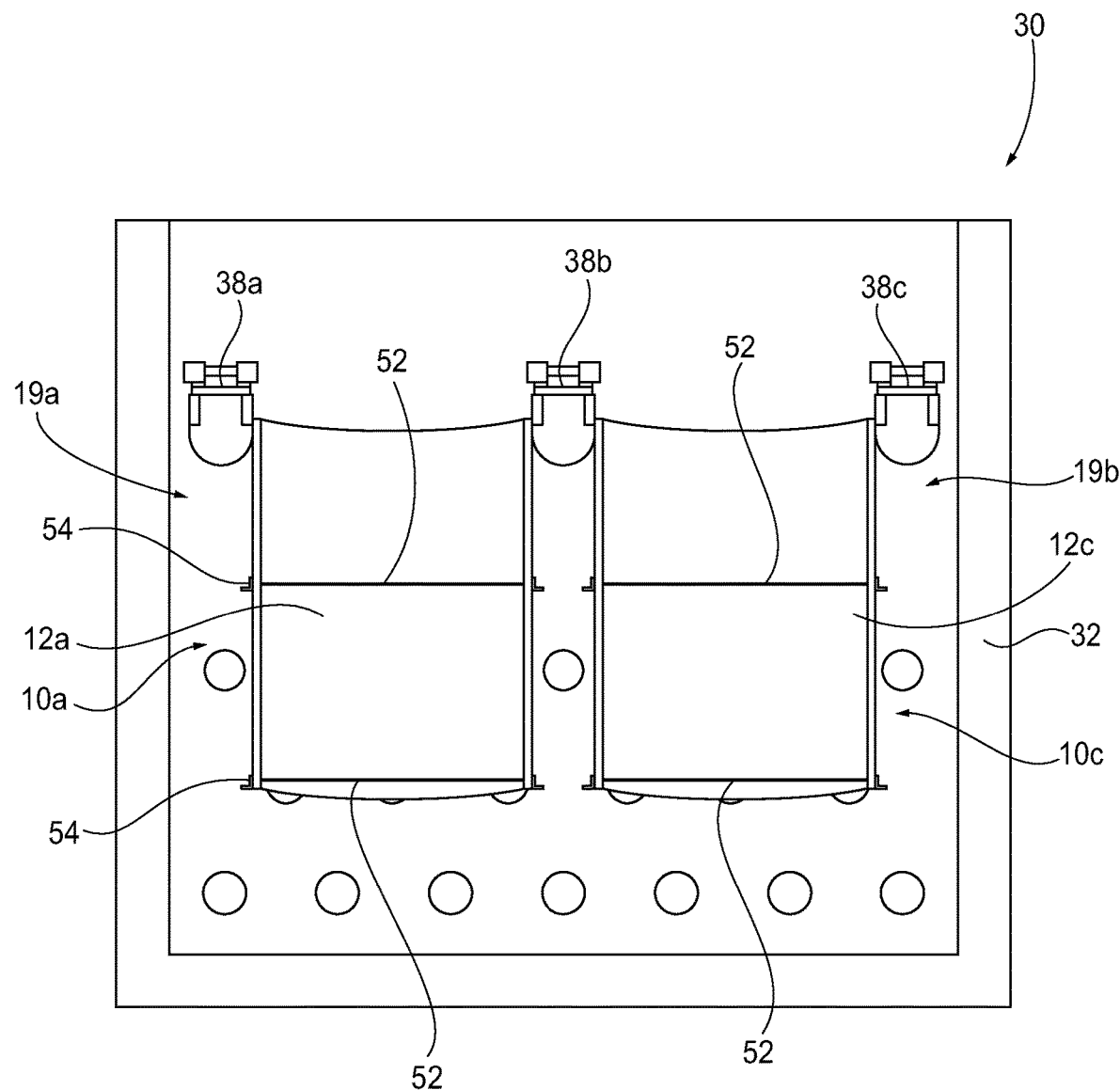
FIG. 7 shows a front view of the water treatment system of FIG. 5.
Figure 8:
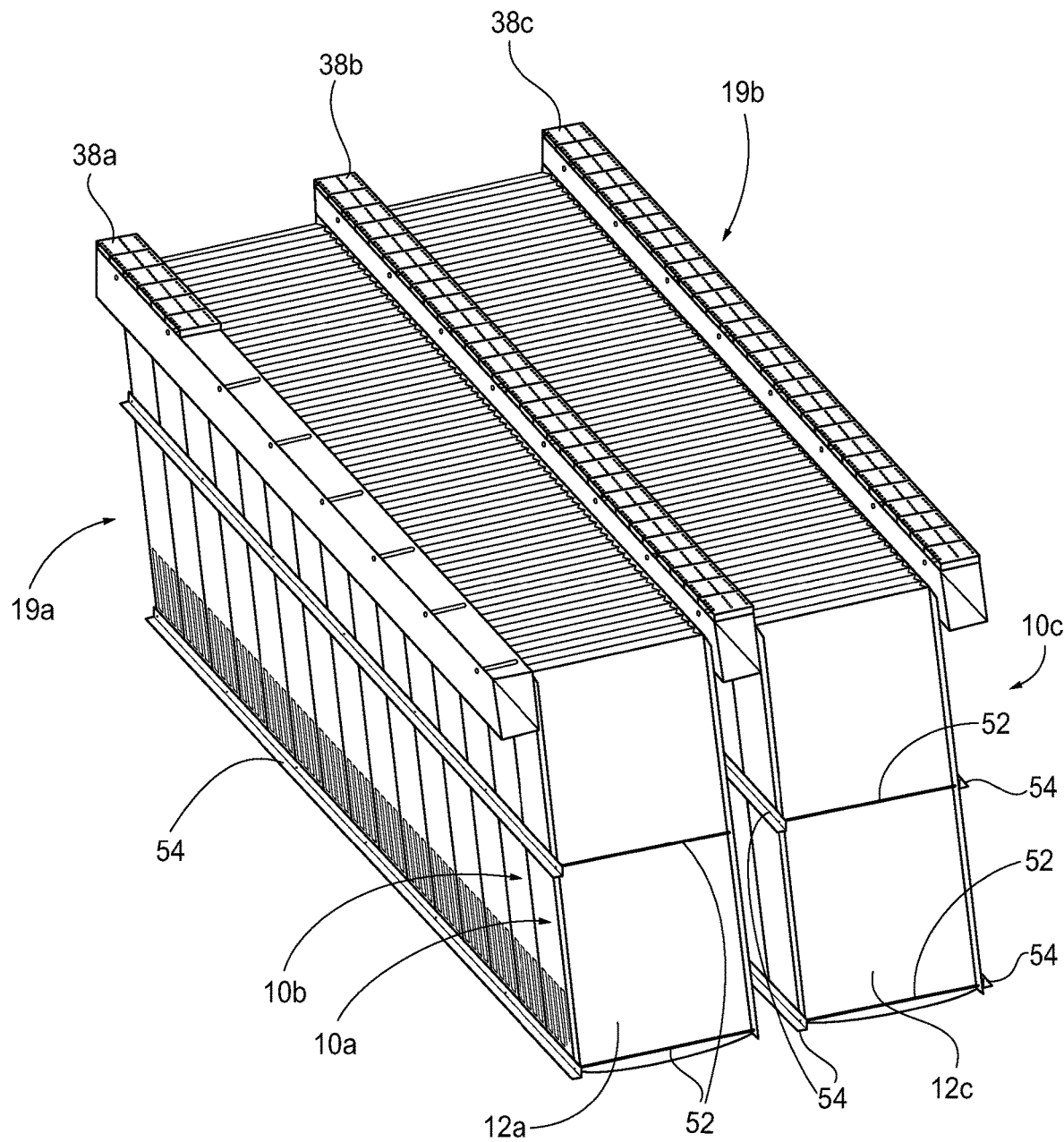
FIG. 8 shows a perspective view of the clarifier shown in FIG. 5 not positioned in a basin.
Figure 9:
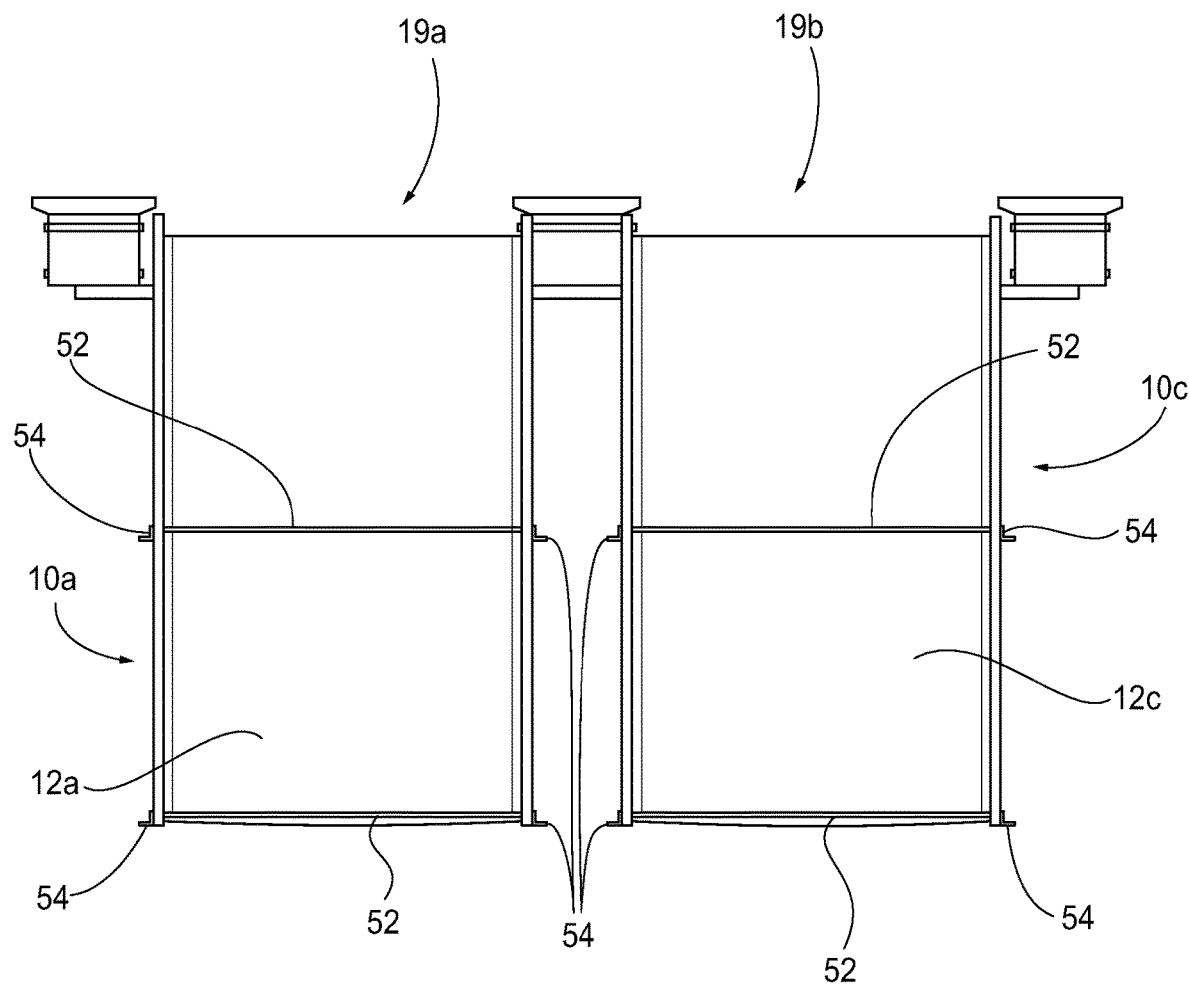
FIG. 9 shows a front view of the clarifier shown in FIG. 5 not positioned in a basin.
Figure 10:
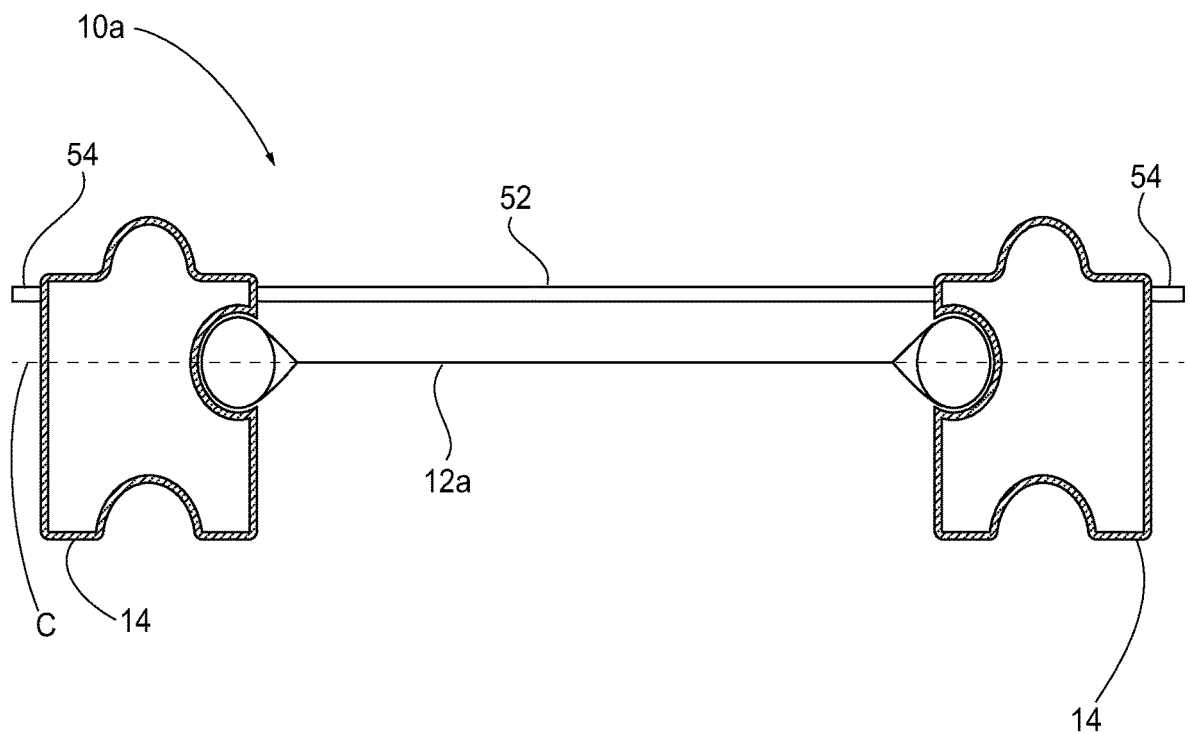
FIG. 10 shows a bottom view of a module of the clarifier shown in FIG. 5.
Figure 11:
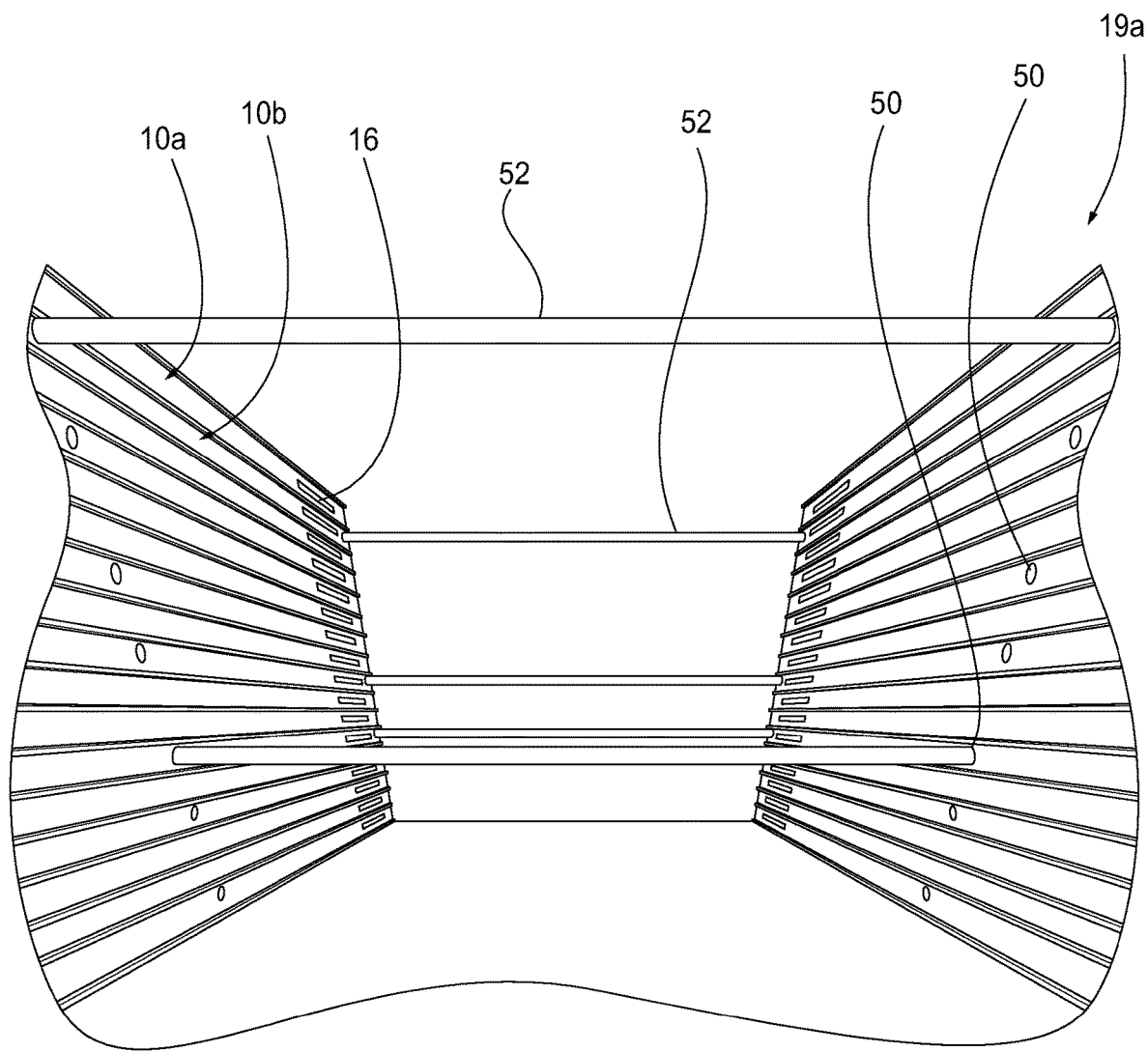
FIG. 11 shows a top view of a module of the clarifier shown in FIG. 5 with the planar inclined sheets removed.
Figure 12:
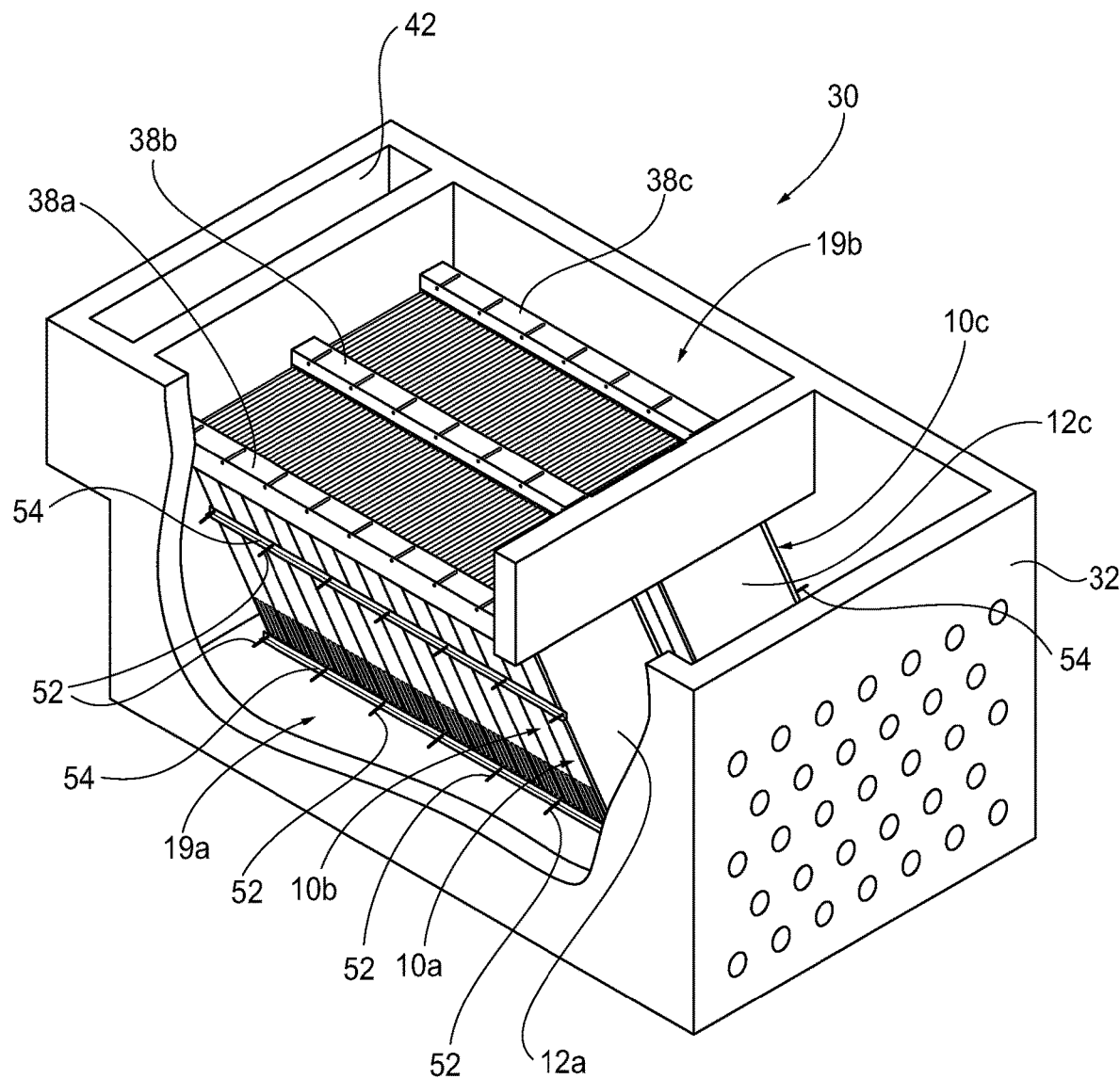
FIG. 12 shows a perspective view of a water treatment system.
Figure 13:
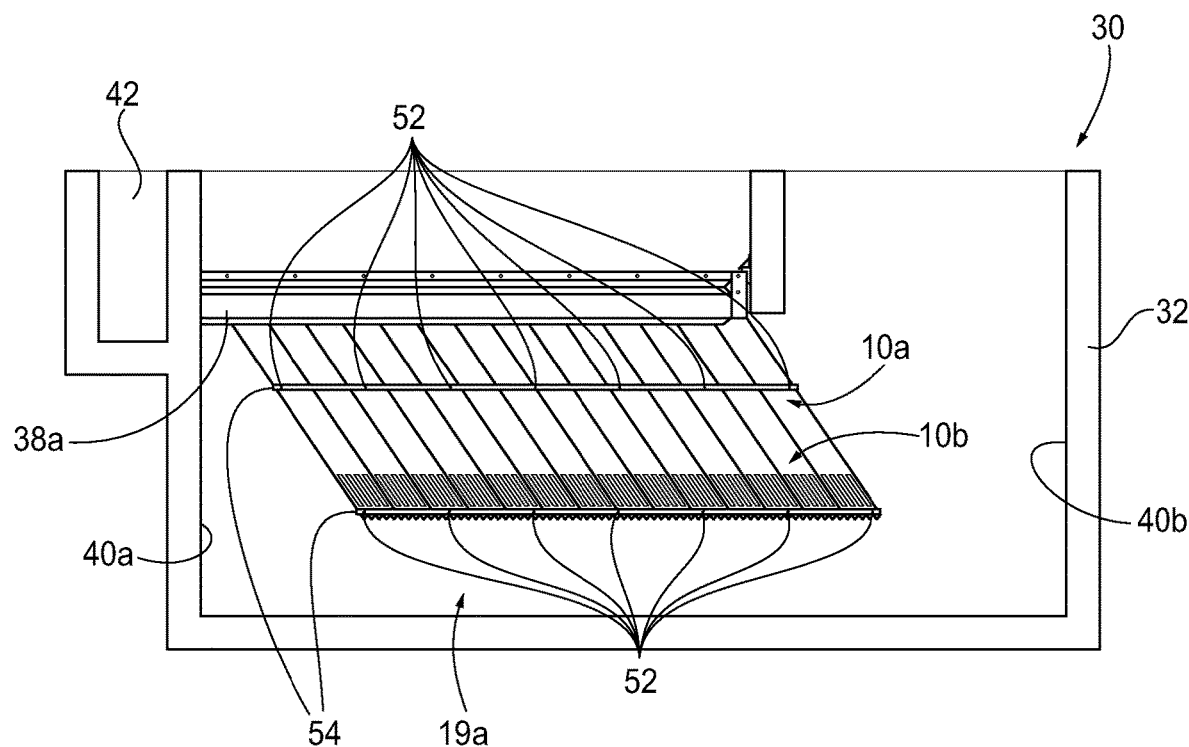
FIG. 13 shows a side view of the water treatment system of FIG. 12.
Figure 14:
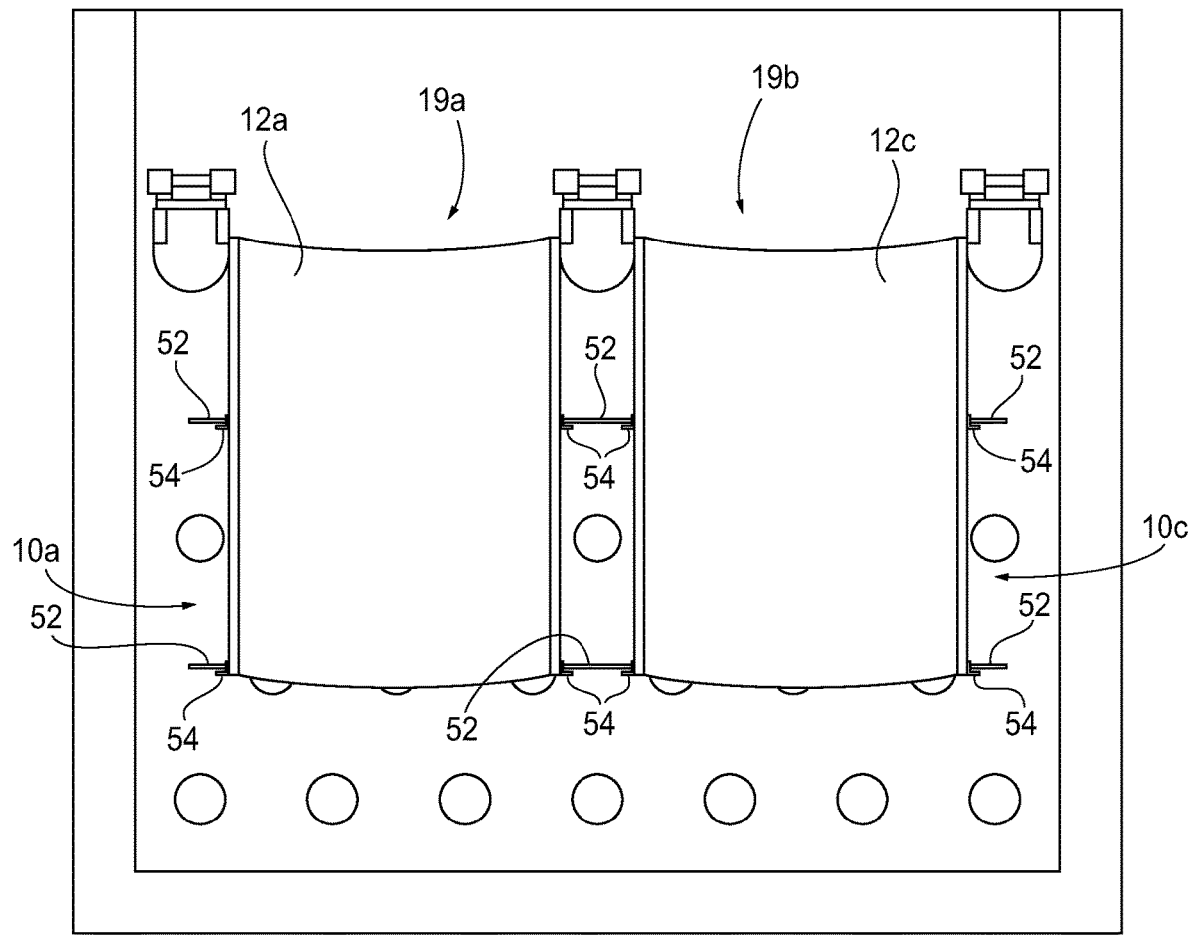
FIG. 14 shows a front view of the water treatment system of FIG. 12.
Figure 15:
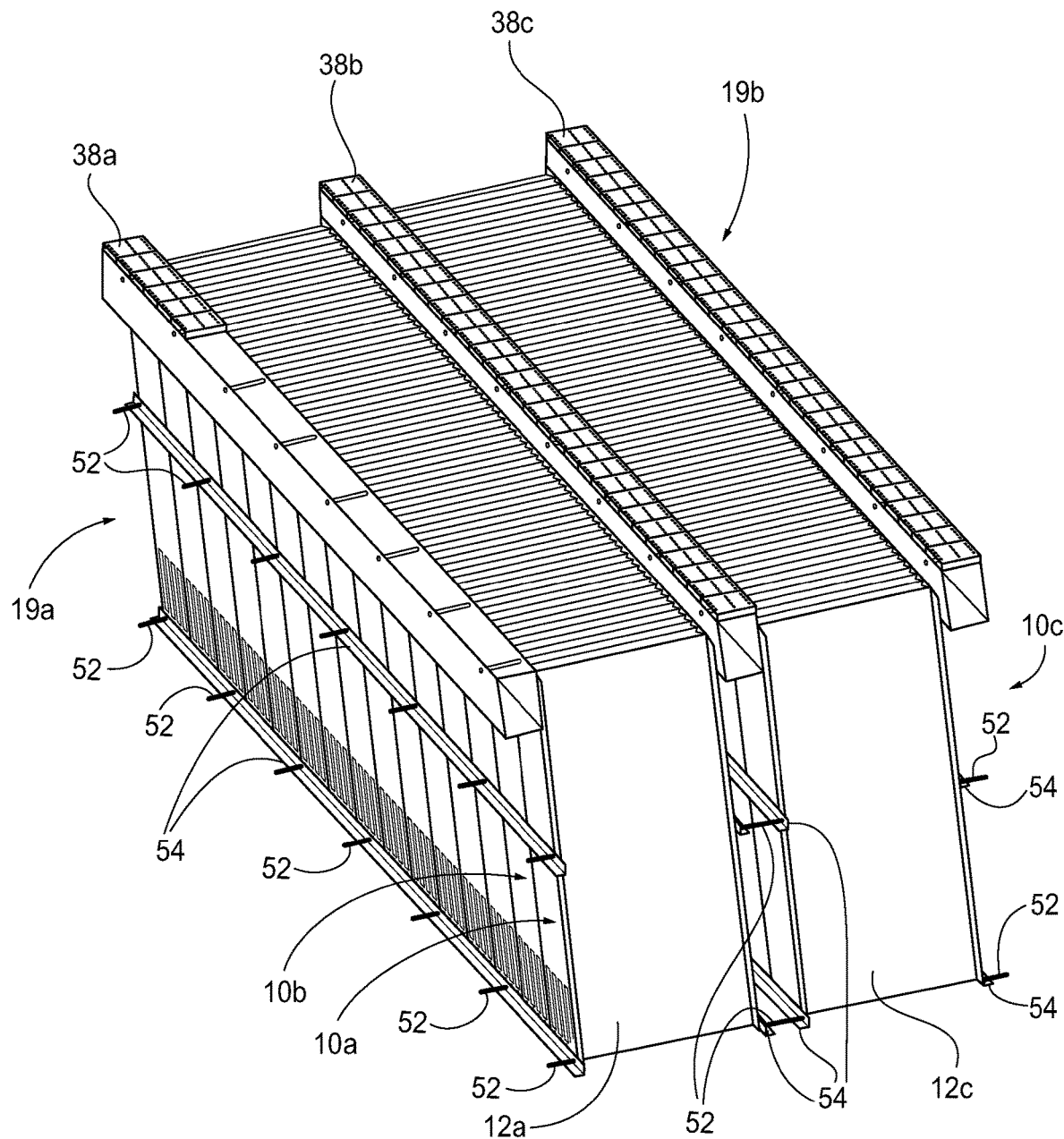
FIG. 15 shows a perspective view of the clarifier of FIG. 12 not positioned in a basin.
Figure 16:
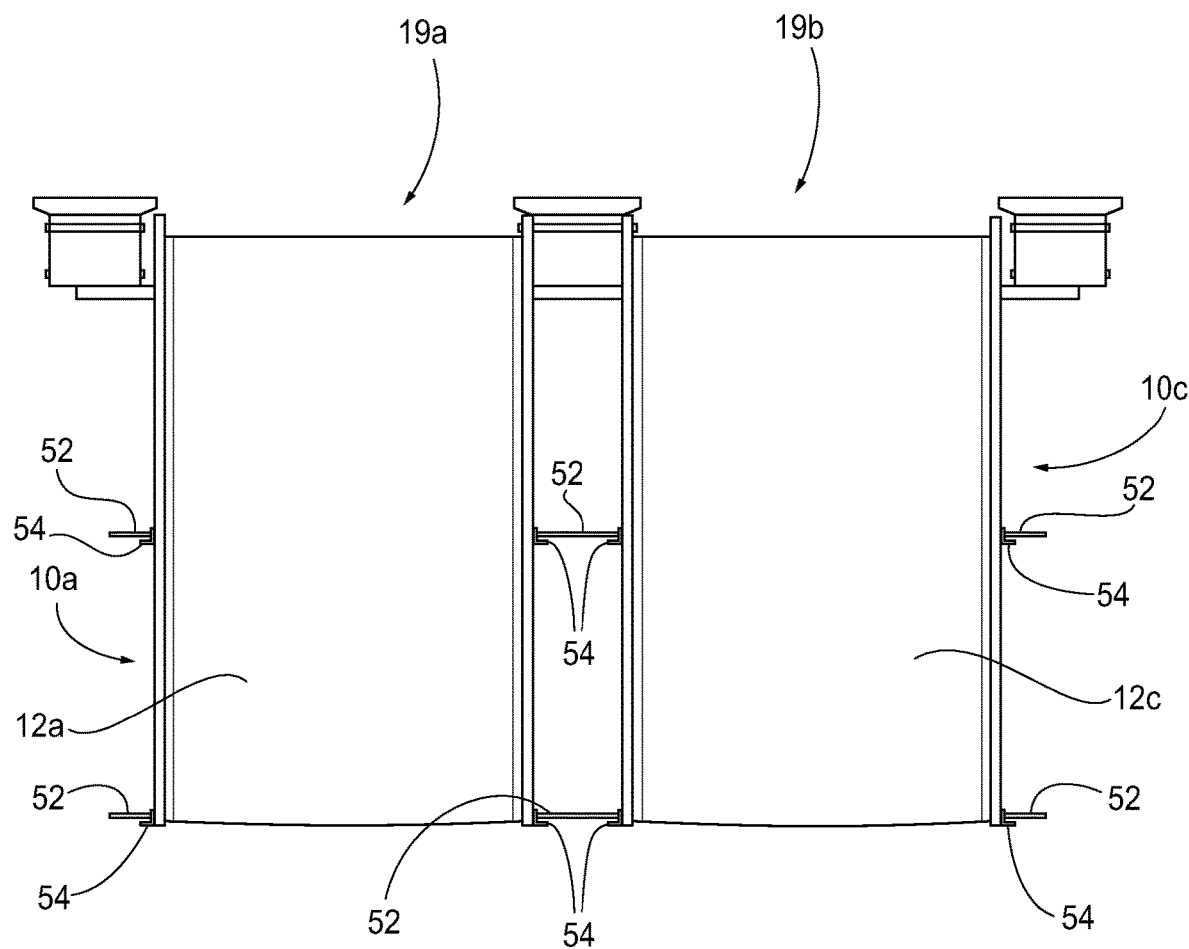
FIG. 16 shows a front view of the clarifier of FIG. 12 not positioned in a basin.

Referring to FIG. 4, another non-limiting embodiment of a clarifier 19 is shown, which includes the module 10. The module 10 shown in FIG. 4 includes the vertically-oriented supports 14 as previously described. The vertically-oriented supports 14 include the tongue 22 and groove 20 as previously described. In this non-limiting embodiment, the vertically-oriented supports 14 tension a plurality of sheets 12 therebetween. Five sheets 12 are tensioned between the vertically-oriented supports 14 in this particular embodiment, but it will be appreciated that any number of sheets 12 may be tensioned between vertically-oriented supports 14 of any single module 10.

Referring to FIGS. 5-17, a water treatment system 30 is shown according to a non-limiting embodiment. The water treatment system 30 includes a basin 32 defined by a plurality of walls and a floor. The water treatment system 30 includes at least one clarifier 19a, 19b positioned in the basin 32. The clarifier 19a, 19b may be supported in the basin 32 using any suitable arrangement. For example, cables (not shown) may be used to support the clarifier 19a, 19b in various ways, such as securing the cables to the basin 32 and the clarifier 19a, 19b and/or placing the clarifier 19a, 19b on top of the cables, so that the cables are in contact with the tensioners 52. Clarifiers 19a, 19b may be arranged side-by-side (e.g., module 10a of the first clarifier 19a is arranged side-by-side with module 10c of the second clarifier 19b).

With continued reference to FIGS. 5-17, the clarifier 19a, 19b may further include a collection system including a collection trough 38a, 38b, 38c arranged at least partially above the clarifier 19a, 19b. The collection trough 38a, 38b, 38c may be configured to receive clarified water flowing through the clarifier 19a, 19b, such as the water flowing out the top of the clarifier 19a, 19b, which has been clarified by gravity causing the waste materials from the waste water flowed to the clarifier 19a, 19b being settled to the bottom. The basin 32 may include an effluent channel 42, into which clarified water treated by the water treatment system 30 is flowed. In some non-limiting examples, the clarified water may flow from the collection trough 38a, 38b, 38c into the effluent channel 42.

With continued reference to FIGS. 5-17, the clarifier 19a, 19b may include at least one tensioner 52. The at least one tensioner 52 may be inserted into the plurality of holes 50 of the plurality of vertically-oriented supports 14 and secured to the plurality of vertically-oriented supports by any suitable means, such as a fastener 54. The at least one tensioner 52 may be configured to bring the planar inclined sheet 12a, 12c to an even centerline C. The at least one tensioner 52 may be self-adjusting. As used herein, the tensioner 52 being "self-adjusting" means that the at least one tensioner 52 may apply the necessary force to bring the planar inclined sheet 12a, 12c to an even centerline C and to keep the planar inclined sheet 12a, 12c at an even centerline C even if the material of the planar inclined sheet weakens overtime. As such, the self-adjusting tensioner 52 does not need manually adjusted when the material of the planar inclined sheet 12a, 12c weakens overtime. The clarifier 19a, 19b may include a plurality of tensioners 52. The clarifier may include a plurality of modules (e.g., in FIG. 8, clarifier 19a includes a plurality of modules 10a, 10b). For example, in one non-limiting embodiment where the clarifier 19 comprises a plurality of modules 10, at least one tensioner 52 may be provided on every module 10, or every second module 10, or every third module 10, or every fourth module 10.

With continued reference to FIGS. 5-17, a method for treating water may include providing a clarifier 19 as described herein. Water may be flowed into the basin 32 and may flow follow to the clarifier 19. Waste material from the water may settle to the bottom of the clarifier 19 by gravity forcing the waste material to flow down the hydrophobic surface 13 of the inclined sheet 12, while the clarified water (having less waste materials therein compared to the initial water) continues to flow up the inclined sheet 12, which may collect in the collection system including the collection troughs 38a, 38b, 38c. Thus, the method includes collection clarified water and/or waste materials that have been separated by the clarifier 19 from the initial water.

With reference to FIGS. 5-11, the at least one module 10a, 10c of the at least one clarifier 19a, 19b may include at least one tensioner 52. The at least one tensioner 52 may be oriented horizontally (relative to the ground) and provided internal of the plurality of vertically-oriented supports 14 so that the at least one tensioner 52 pushes against the plurality of vertically-oriented supports 14 to bring the at least one planar inclined sheet 12a, 12c to an even centerline C, shown in FIG. 10. It is appreciated that provided internal of the plurality of vertically-oriented supports 14 refers to a tensioner 52 that is provided between the vertically-oriented supports 14 of a module 10a, 10c that are tensioning the at least one planar inclined sheet 12a, 12c. In one non-limiting embodiment, the at least one tensioner 52 provided internal of the plurality of vertically-oriented supports 14 may be self-adjusting.

In one non-limiting embodiment, the at least one tensioner 52 provided internal of the plurality of vertically-oriented supports 14 may include two sections of telescoping tubing with an integrated spring. One section of tubing may partially telescope into the second section of tubing and an integrated spring may be provided between the two sections of tubing. If an external force is applied to either or both ends of the at least one tensioner 52, the spring may push back against this applied external force. As such, it is appreciated that no manual adjustment is needed of the at least one tensioner 52 to bring the at least one planar inclined sheet 12a, 12c to an even centerline C. The tubing sections and the spring of the at least one tensioner 52 may include various materials, such as metals and/or plastics. For example, the at least one tensioner 52 may comprise stainless steel. In another non-limiting embodiment, the at least one tensioner 52 may include two threaded rods, with one rod threaded into the other rod. If an external force is applied to either or both ends of the at least one tensioner 52, the threaded rods may push against the plurality of vertically-oriented supports 14 to create tension and bring the at least one planar inclined sheet 12a, 12c to an even centerline C.

With continued reference to FIGS. 5-11, the module 10a, 10c may include a tensioner 52 provided internal of the plurality of vertically-oriented supports 14 and located at the middle of the module 10a, 10c. Alternatively, or in addition to the tensioner 52 located at the middle of the module 10a, 10c, the module 10a, 10c may include a tensioner 52 provided internal of the plurality of vertically-oriented supports 14 and located at the bottom of the module 10a, 10c. For example, the module 10a, 10c may include a plurality of tensioners 52, which may include a first tensioner 52 oriented horizontally and provided internal of the vertically-oriented supports 14 and at the middle of the module 10a, 10c, and a second tensioner 52 oriented horizontally and provided internal of vertically-oriented supports 14 and at the bottom of the module 10a, 10c. If the clarifier 19 includes a plurality of modules 10 (e.g., modules 10a, 10b in clarifier 19a), the at least one tensioner 52, such as the plurality of tensioners 52, may be present on every module 10, or every second module 10, or every third module 10, or every fourth module 10. In one non-limiting embodiment, the clarifier 19a, 19b includes a plurality of modules 10 and includes at least one tensioner 52, such as a plurality of tensioners 52, on every second module 10.

With continued reference to FIGS. 5-11, the at least one tensioner 52 provided internal of the plurality of vertically-oriented supports 14 may be secured to the vertically-oriented supports by any suitable means. For example, each end of the at least one tensioner 52 may be inserted into a hole 50 of the plurality of holes 50 on the inner face (i.e., the face adjacent to the planar inclined sheet 12a, 12c) of the plurality of vertically-oriented supports 14, with each end of the at least one tensioner 52 being secured to the plurality of vertically-oriented supports 14 with a fastener 54. Each end of the at least one tensioner 52 may be threaded to aid in securing to the vertically-oriented supports 14 and the fasteners 54.

Figure 17:
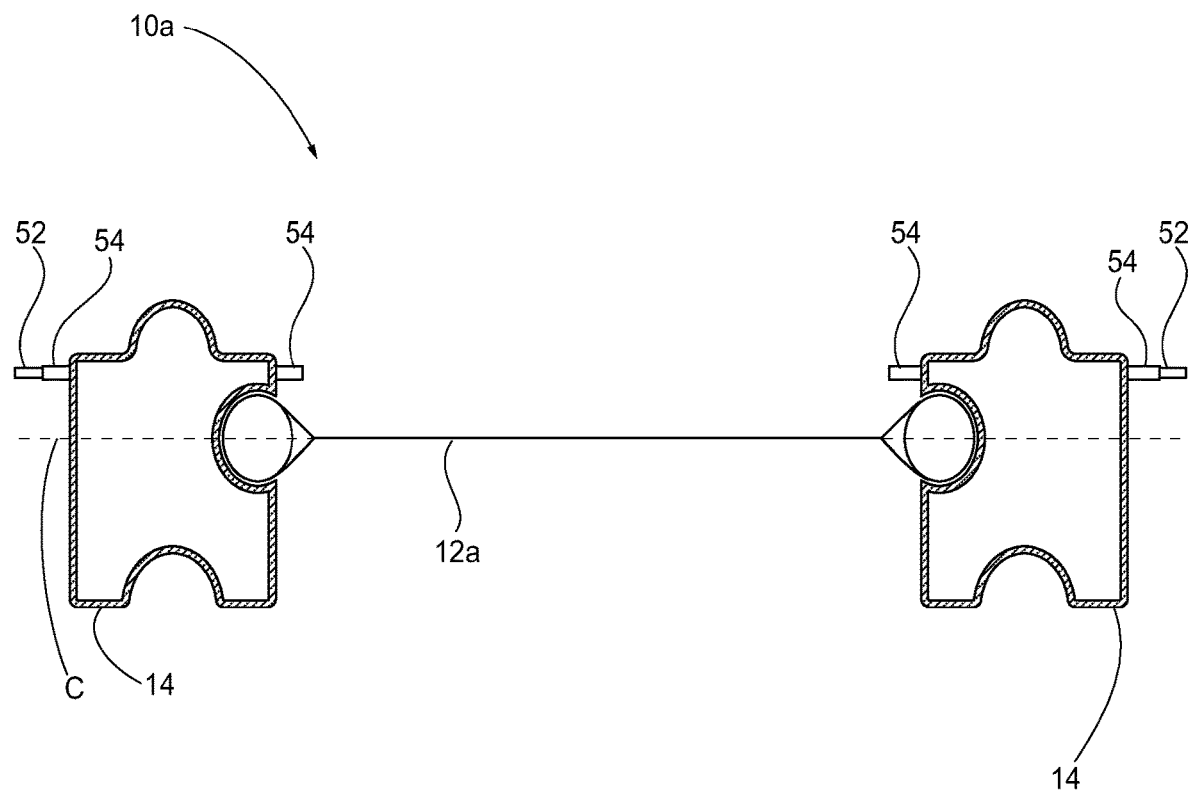
FIG. 17 shows a bottom view of a module of the clarifier of FIG. 12.

With reference to FIGS. 12-17, the at least one module 10a, 10c of the at least one clarifier 19a, 19b may include at least one tensioner 52. The at least one tensioner 52 may be oriented horizontally (relative to the ground) and provided external of the plurality of vertically-oriented supports 14 so that the at least one tensioner 52 pulls against a vertically-oriented support of the plurality of vertically-oriented supports 14 to bring the at least one planar inclined sheet 12a, 12c to an even centerline C, as shown in FIG. 17. It is appreciated that provided external of the plurality of vertically-oriented supports 14 refers to a tensioner 52 that is provided on the outer face of the vertically-oriented supports 14, opposite from the face of said vertically-oriented supports 14 adjacent to the tensioned planar inclined sheet 12a, 12c. The at least one tensioner 52 provided external of the plurality of vertically-oriented supports 14 may be self-adjusting. In one non-limiting embodiment, the at least one tensioner 52 provided external of the plurality of vertically-oriented supports 14 may include a turnbuckle and a cable.

With continued reference to FIGS. 12-17, the module 10a, 10c may include a tensioner 52 provided external of the plurality of vertically-oriented supports 14 on a first side of the module 10a, 10c and located at the middle of the module 10a, 10c, and a tensioner 52 provided external of the plurality of vertically-oriented supports 14 on a second side opposite the first side of the module 10a, 10c and located at the middle of the module 10a, 10c. Alternatively, or in addition to the aforementioned tensioners 52 located at the middle of the module 10a, 10c, the module 10a, 10c may include a tensioner 52 provided external of the plurality of vertically-oriented supports 14 on a first side of the module 10a, 10c and located at the bottom of the module 10a, 10c, and a tensioner 52 provided external of the plurality of vertically-oriented supports 14 on a second side opposite the first side of the module 10a, 10c and located at the bottom of the module 10a, 10c. For example, the module 10a, 10c may include a plurality of tensioners 52, which may include a first tensioner 52 oriented horizontally and provided external of the vertically-oriented supports 14 on a first side of the module 10a, 10c and located at the middle of the module 10a, 10c, a second tensioner 52 oriented horizontally and provided external of the vertically-oriented supports 14 on a second side opposite the first side of the module 10a, 10c and located at the middle of the module 10a, 10c, a third tensioner 52 oriented horizontally and provided external of the plurality of vertically-oriented supports 14 on a first side of the module 10a, 10c and located at the bottom of the module 10a, 10c, and/or a fourth tensioner 52 oriented horizontally provided external of the plurality of vertically-oriented supports 14 on a second side opposite the first side of the module 10a, 10c and located at the bottom of the module 10a, 10c. If the clarifier 19 includes a plurality of modules 10 (e.g., modules 10a, 10b in clarifier 19a), the at least one tensioner 52, such as the plurality of tensioners 52, may be present on every module 10, or every second module 10, or every third module 10, or every fourth module 10. In one non-limiting embodiment, the clarifier includes a plurality of modules 10 and includes at least one tensioner 52, such as a plurality of tensioners 52, on every second module 10.

With continued reference to FIGS. 12-17, the at least one tensioner 52, such as the plurality of tensioners 52, provided external of the plurality of vertically-oriented supports 14 may be secured to the vertically-oriented supports 14 by any suitable means. For example, an end of the at least one tensioner 52 may be inserted into a hole 50 of the plurality of holes 50 on the outer face of the plurality of vertically-oriented supports 14, with said end of the at least one tensioner 52 being secured to the plurality of vertically-oriented supports 14 with a fastener 54. Said end of the at least one tensioner 52 may be threaded to aid in securing to the vertically-oriented supports 14 and the fasteners 54. In one non-limiting embodiment, the at least one tensioner 52, such as the plurality of tensioners 52, may include a cable and a turnbuckle where an end of the cable inserted into a hole 50 on the outer face of the plurality of vertically-oriented supports 14 and secured with a fastener 54. In one non-limiting embodiment, the cable of the tensioner 52 is threaded and secured to the plurality of vertically-oriented supports with a fastener 54.

With continued reference to FIGS. 12-17, the water treatment system may include more than one clarifier 19, such as clarifiers 19a, 19b. The clarifier 19a and clarifier 19b may be arranged side-by-side, such that module 10a is side-by-side with module 10c. Each module 10a, 10c may include at least one tensioner 52, such as the plurality of tensioners 52, as previously described. The at least one tensioner 52, such as the plurality of tensioners 52, may be provided internal and/or external of the plurality of vertically-oriented supports 14, as previously described. The modules 10a, 10c of clarifiers 19a, 19b may share a tensioner 52 provided external of the vertically-oriented supports 14 of each module 10a, 10c and located at the middle of each module 10a, 10c with the shared tensioner 52 spanning across the area between the clarifiers 19a, 19b. Alternatively, or in addition to the tensioner 52 provided external of the vertically-oriented supports 14 of each module 10a, 10c and located at the middle of each module 10a, 10c with the shared tensioner 52 spanning across the area between the clarifiers 19a, 19b, modules 10a, 10c of clarifiers 19a, 19b may share a tensioner 52 provided external of the vertically-oriented supports 14 of each module 10a, 10c and located at the bottom of each module 10a, 10c with the shared tensioner 52 spanning across the area between the clarifiers 19a, 19b. Each tensioner 52 that spans across the area between the clarifiers 19a, 19b may be secured to each module 10a, 10c by any suitable means. For example each end of each tensioner 52 that spans across the area between the clarifiers 19a, 19b may be inserted into a hole 50 through the outer face of a vertically-oriented support 14 on each of modules 10a, 10c and secured with a fastener 54.

Although non-limiting embodiments have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A clarifier for water treatment comprising:
   a module comprising:
   a planar inclined sheet;
   a plurality of vertically-oriented supports; and
   a tensioner;
   wherein the planar inclined sheet is tensioned between the plurality of vertically-oriented supports;
   wherein the tensioner is configured to bring the planar inclined sheet to an even centerline; and
   wherein the tensioner is self-adjusting.

2. The clarifier of claim 1, wherein the tensioner is provided internal of the plurality of vertically-oriented supports and pushes against the plurality of vertically-oriented supports to bring the planar inclined sheet to an even centerline.

3. The clarifier of claim 2, wherein the tensioner comprises a tensioner oriented horizontally and located at the middle of the module.

4. The clarifier of claim 2, wherein the tensioner comprises a tensioner oriented horizontally and located at the bottom of the module.

5. The clarifier of claim 1, wherein the tensioner is provided external of the plurality of vertically-oriented supports and pulls on a vertically-oriented support of the plurality of vertically-oriented supports to bring the planar inclined sheet to an even centerline.

6. The clarifier of claim 5, wherein the tensioner comprises a first tensioner oriented horizontally and on a first side of the module and located at the middle of the module, and second tensioner oriented horizontally and on a second side of the module opposite the first side and located at the middle of the module.

7. The clarifier of claim 5, wherein the tensioner comprises a first tensioner oriented horizontally and on a first side of the module and located at the bottom of the module, and second tensioner oriented horizontally and on a second side of the module opposite the first side and located at the middle of the module.

8. The clarifier of claim 1, wherein the planar inclined sheet comprises a flexible polymeric material.

9. The clarifier of claim 1, comprising a plurality of planar inclined sheets.

10. The clarifier of claim 9, wherein the plurality of planar inclined sheets are positioned at an angle relative to the ground of from 10° to 90°.

11. The clarifier of claim 9, wherein the plurality of planar inclined sheets are arranged parallel to one another, and each sheet of the plurality of planar inclined sheets is tensioned between a plurality of vertically-oriented supports.

12. The clarifier of claim 11, wherein vertically-oriented supports tensioning a first sheet of the plurality of planar inclined sheets interlock with adjacent vertically-oriented supports tensioning a second sheet of the plurality of planar inclined sheets.

13. The clarifier of claim 1, wherein a vertically-oriented support of the plurality of vertically-oriented supports comprises an inlet opening configured to allow liquid to flow therethrough.

14. The clarifier of claim 1, comprising a plurality of modules and a plurality of tensioners, wherein at least one tensioner of the plurality of tensioners is present on every second module of the plurality of modules.

15. A water treatment system comprising:
    a basin; and
    the clarifier according to claim 1 positioned in the basin.

16. The water treatment system of claim 15, comprising a plurality of planar inclined sheets.

17. The water treatment system of claim 16, wherein each sheet of the plurality of planar inclined sheets is tensioned between the plurality of vertically-oriented supports.

18. The water treatment system of claim 15, comprising a plurality of modules and a plurality of tensioners, wherein at least one tensioner of the plurality of tensioners is present on every second module of the plurality of modules.

19. The water treatment system of claim 15, further comprising a collection system comprising a collection trough arranged at least partially above the clarifier.

20. A method for treating water comprising:
    providing the clarifier according to claim 1;
    flowing water to the clarifier; and
    collecting clarified water and/or waste material separated from the water by the clarifier.

* * * * *